US006378038B1

(12) United States Patent
Richardson et al.

(10) Patent No.: US 6,378,038 B1
(45) Date of Patent: Apr. 23, 2002

(54) METHOD AND SYSTEM FOR CACHING DATA USING RAID LEVEL SELECTION

(75) Inventors: Philip Anthony Richardson, Apex; Shah Mohammad Rezaul Islam, Cary; Linda Ann Riedle, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,852

(22) Filed: Mar. 31, 1999

(51) Int. Cl.$^7$ ............................ G06F 11/20; G11B 17/22
(52) U.S. Cl. ..................... 711/114; 711/114; 711/173; 714/6; 714/7
(58) Field of Search ................... 711/114, 113, 711/112, 118, 133, 135, 141, 144, 145, 154, 159, 162, 165, 4, 202, 170–173; 714/6, 7, 770

(56) References Cited

U.S. PATENT DOCUMENTS

| | | | | |
|---|---|---|---|---|
| 5,392,244 A | * | 2/1995 | Jacobson et al. | 711/114 |
| 5,481,694 A | | 1/1996 | Chao et al. | 711/112 |
| 5,537,534 A | * | 7/1996 | Voigt et al. | 714/6 |
| 5,542,065 A | * | 7/1996 | Burkes et al. | 711/114 |
| 5,546,558 A | * | 8/1996 | Jacobson et al. | 711/114 |
| 5,657,468 A | * | 8/1997 | Stallmo et al. | 711/114 |
| 5,659,704 A | * | 8/1997 | Burkes et al. | 711/114 |
| 5,754,756 A | * | 5/1998 | Watanabe et al. | 714/6 |
| 5,797,022 A | * | 8/1998 | Shimotono et al. | 713/323 |
| 5,875,457 A | * | 2/1999 | Shalit | 711/114 |
| 5,895,488 A | * | 4/1999 | Loechel | 711/135 |
| 5,960,169 A | * | 9/1999 | Styezinski | 714/6 |
| 6,049,890 A | * | 4/2000 | Kakuta et al. | 714/6 |
| 6,098,119 A | * | 8/2000 | Surugucchi et al. | 710/10 |

OTHER PUBLICATIONS

"Understanding AutoRAID Write Working Set Metric," Hewlett Packard, 1998.
"HP Disk Array with AutoRAID for HP 9000 Servers and Workstations," Hewlett Packard, Dec. 5, 1996.
"Dynamic RAID Technology From Hewlett–Packard Addresses Issues in Current High Availability," Hewlett Parckard, Apr. 1997.

* cited by examiner

Primary Examiner—Hong Kim
(74) Attorney, Agent, or Firm—Sawyer Law Group, LLP

(57) ABSTRACT

A method and system for storing data in a redundant array of inexpensive disks (RAID) data storage subsystem is disclosed. The RAID data storage subsystem includes a plurality of drives. The method and system include temporarily storing data in a first portion of the plurality of drives using a first RAID level and relatively permanently storing the data in a second portion the plurality of drives using a second RAID level. The step of relatively permanently storing the data is performed at a time when performance of the system is not substantially affected by storage using the second RAID level. Furthermore, the temporary storing step and the step of storing the data using the second RAID level may be performed throughout operation of the RAID data storage subsystem. Thus, RAID data may be cached using the first RAID level, then relatively permanently stored using the second RAID level.

16 Claims, 6 Drawing Sheets

Prior Art

METHOD AND SYSTEM FOR CACHING DATA USING RAID LEVEL SELECTION

FIELD OF THE INVENTION

The present invention relates to data storage systems and more particularly to a method and system for improving performance of a RAID (redundant array of inexpensive disks) data storage subsystem.

BACKGROUND OF THE INVENTION

In order to store data, some computer systems use a redundant array of inexpensive disks ("RAID") data storage subsystem. For example, a RAID subsystem may be coupled with a host or server that services clients on a network. The RAID subsystem typically includes a controller and a plurality of disk drives. The controller generally controls operations of the RAID subsystem. Information is physically stored on the drives.

There are many conventional techniques for using the RAID data storage subsystem. RAID levels are typically used to determine how data will be stored in a RAID subsystem. Each technique has different performance characteristics and a different ability to provide redundancy. Redundancy is desirable in order to be able to recover data on a drive that becomes defective. However, it is also desirable to provide sufficiently rapid access times in order to ensure that performance does not suffer.

RAID-0 stores the data on the drives of the conventional RAID subsystem. Data are interleaved by striping the blocks of data across the drives. Typically, a block is from 8K through 64K bytes. However, RAID-0 does not have any redundancy.

RAID-1 uses a technique called "mirroring," in which data are stored on a first drive and a copy of the data are stored on a second drive. Because data are stored on two disks, a request for data can be serviced by one drive, while the other drive is servicing a second request. However, a great deal of space is consumed because two copies of the data are stored.

RAID-2 stripes bits of data across multiple drives and uses error-correcting codes in addition to data striping. RAID-3 also stripes bits of data across multiple drives. Parity bits are stored on a separate drive or drives to provide redundancy. In addition, the drives storing data can be operated in unison and in parallel. Thus, a request can be simultaneously serviced by all data drives. RAID-4 is similar to RAID-3 except that the data drives are operated independently and blocks of data are striped across the data drives.

RAID-5 is the most widely used RAID level. RAID-5 stripes blocks of data over multiple drives and uses parity bits. However, unlike RAID-4, RAID-5 does not use separate dedicated parity disks. Instead, RAID-5 distributes the parity bits over multiple drives. RAID-6 stripes data and parity bits across multiple drives. However, RAID-6 uses an additional parity calculation.

Although RAID-5 is widely used in RAID subsystems because of the cost efficiency of RAID-5, RAID-5 uses a read-modify-write to calculate parity. The read-modify-write calculation is thus performed for each write. This calculation is time consuming. Thus, RAID-5 has relatively slow write performance. Although some sequential workloads and write-back cache designs improve performance, other workloads are used in RAID subsystems. For example, some applications have a large number of reads and a relatively small number of writes. Such applications may not have sequential workloads or utilize write-back caches. Consequently, the write performance for these other workloads still suffers.

Accordingly, what is needed is a system and method for more efficiently providing writes in a RAID subsystem, particularly for applications having a large number of read requests as compared to write requests. The present invention addresses such a need.

SUMMARY OF THE INVENTION

The present invention provides a method and system for storing data in a redundant array of inexpensive disks (RAID) data storage subsystem. The RAID data storage subsystem includes a plurality of drives. The method and system comprise temporarily storing data in a first portion of the plurality of drives using a first RAID level and storing the data in a second portion of the plurality of drives using a second RAID level. The step of relatively permanently storing the data is performed at a time when performance of the system is not adversely affected by storage using the second RAID level. Furthermore, the temporary storing step and the step of storing the data using the second RAID level can be performed throughout operation of the RAID data storage subsystem.

According to the system and method disclosed herein, the present invention essentially allows RAID data to be cached using a first RAID level. Later, the data may be stored using the second RAID level. The second RAID level requires more time for storing data than the first RAID level but may have other benefits, such as less wasted space on the drives being used.

DETAILED DESCRIPTION OF THE INVENTION

The present invention relates to an improvement in a redundant array of inexpensive disks ("RAID") data storage subsystem. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Many conventional systems employing a RAID data storage subsystem use RAID-5. RAID-5 stripes data across drives in the RAID subsystem and utilizes parity in order to provide redundancy. If a drive fails, the system uses the parity and information on the remaining drives to compensate for the lost information. Thus, the parity calculation is performed for each new segment, or block, of data written to a drive. This parity calculation is known as a read-modify-write parity calculation.

Figure 1:
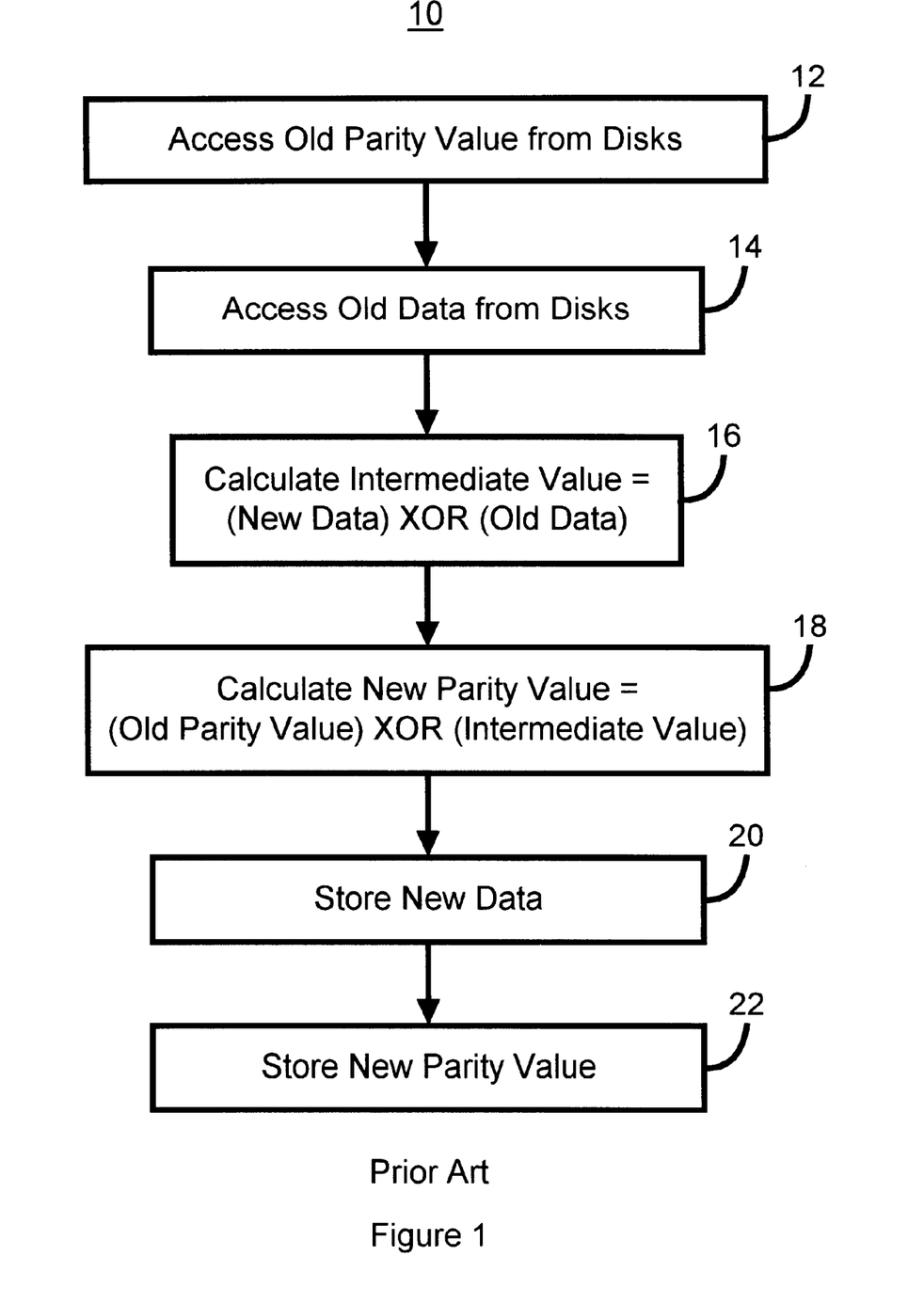
FIG. 1 is a high-level flow chart of a conventional method for storing data using RAID-5.

FIG. 1 depicts a conventional method 10 for writing data to the RAID subsystem, including the read-modify-write algorithm and parity generation. The old parity value is read from the appropriate drive, via step 12. The data being replaced are accessed from the disks, via step 14. An intermediate value is then calculated, via step 16. The intermediate value is determined by performing an exclusive or between the new data and the old data for a stripe. The parity is then calculated by performing an exclusive or of the old parity and the intermediate value, via step 18. The new data is stored by striping the new data in blocks across the disks, via step 20. The new parity value is then stored, via step 22.

Although the conventional method 10 has some advantages and is widely used, one of ordinary skill in the art will readily realize that four input/output operations are performed by the combination of steps 12, 14, 20, and 22. Consequently, processing a write request is relatively time-consuming. This time-consuming process is performed each time a write is requested, regardless of activity on the system using the RAID subsystem. Thus, the user sees a relatively long delay when writing data. This problem may be particularly visible in some systems. For example, there may be many read requests and relatively few write requests for a large database stored using the RAID subsystem. Furthermore, the write requests may occur at a time when system usage is high and system resources relatively scarce. These requests are also generally randomly placed, rather than being sequential. Consequently, processing of the write requests may cause delays both in writing data to the database on the RAID subsystem and in processing other requests.

The present invention provides a method and system for storing data in a redundant array of inexpensive disks (RAID) data storage subsystem. The RAID data storage subsystem includes a plurality of drives. The method and system comprise temporarily storing data in a first portion of the plurality of drives using a first RAID level and storing the data in a second portion of the plurality of drives using a second RAID level. The step of storing the data is performed at a time when performance of the system is not adversely affected by storage using the second RAID level. Furthermore, the temporary storing step and the step of storing the data using the second RAID level can be performed throughout operation of the RAID data storage subsystem. In other words, the process of temporarily storing data using one RAID level, then storing the data using a second RAID level can be carried out at any time during operation of the RAID data storage subsystem.

The present invention will be described in terms of a particular system using the RAID subsystem. However, one of ordinary skill in the art will readily recognize that this method and system will operate effectively for other systems and other usage patterns.

Figure 2:
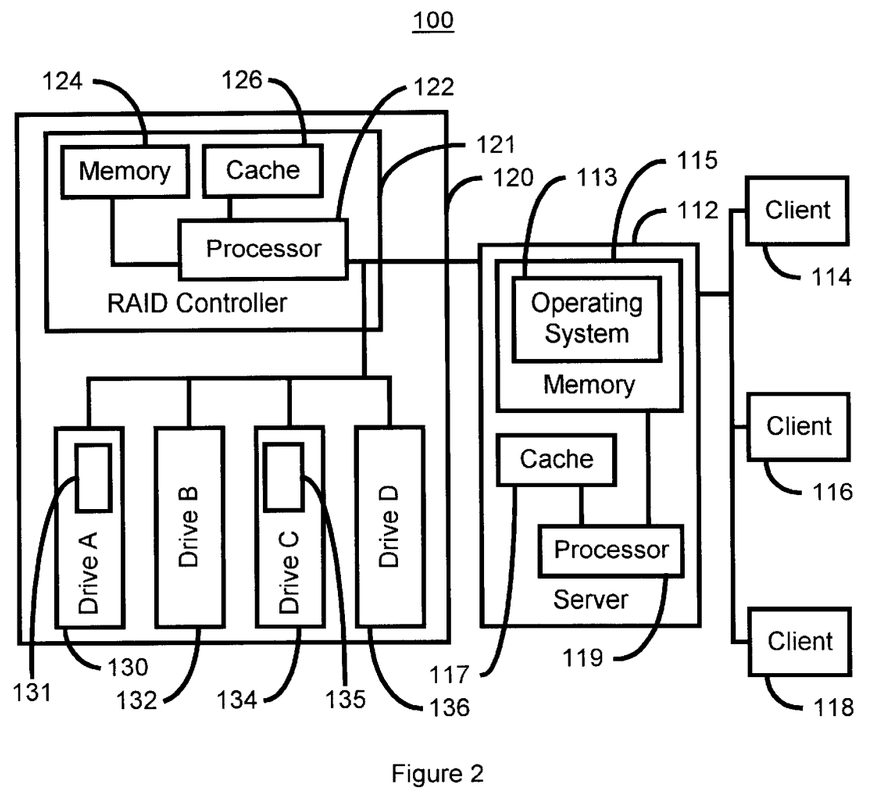
FIG. 2 is a block diagram of a system including a RAID data subsystem in which the present invention may be used.

FIG. 2 is a block diagram of a system 100 in which a RAID subsystem 120 in accordance with the present invention is used for data storage. For clarity, only some features of the system 100 and the RAID subsystem 120 are depicted. The computer system 100 includes a host, such as a server 112 that services clients 114, 116, and 118. The server 112 includes an operating system 113, for managing the server 112, residing on a memory 115. The server 112 also includes a cache 117 for rapid access to data and a processor 119 for running the operating system 113, running other applications (not shown), and performing other operations. The RAID subsystem 120 includes a RAID controller 121, and disk drives 130, 132, 134, and 136. Although four drives 130, 132, 134 and 136 are depicted, nothing prevents the use of another number of drives. Typically, bytes or groups of bytes are striped across the drives 130, 132, 134, and 136. The RAID controller 121 includes processor 122, a memory 124, and a RAID cache 126. The memory 124 may include a nonvolatile memory that stores program instructions for operating the RAID controller 121. When the client 114, 116, or 118 desires to use data stored by one of the drives 130, 132, 134, or 136 in the RAID subsystem 120, a portion of the data may be retrieved into the cache 117. A user operating one of the clients 114, 116, or 118 may then modify or read the data stored in the cache 117. Similarly, when writing data to the RAID subsystem 120, data may be temporarily placed in the cache 117 or 126. In a conventional system, data in the cache 117 or 126 would be stored on the drives 130, 132, 134, or using a particular RAID level, such as RAID-5.

Drive A 130 and drive C 134 also have partitions 131 and 135, respectively. Note that although two drives 130 and 134 are depicted as having partitions 131 and 135, respectively, nothing prevents another number of drives from having similar partitions (not shown). The partitions 131 and 135 may include some percentage of the space on the drives 130 and 134, respectively. For example, the partitions 131 and 135 may each include approximately ten percent of the drives 130 and 134, respectively. The space in partitions 131 and 135 is preferably not cataloged as being part of the available space reported to users. Instead, the space in partitions 131 and 135 is reserved for use as discussed below.

Figure 3:
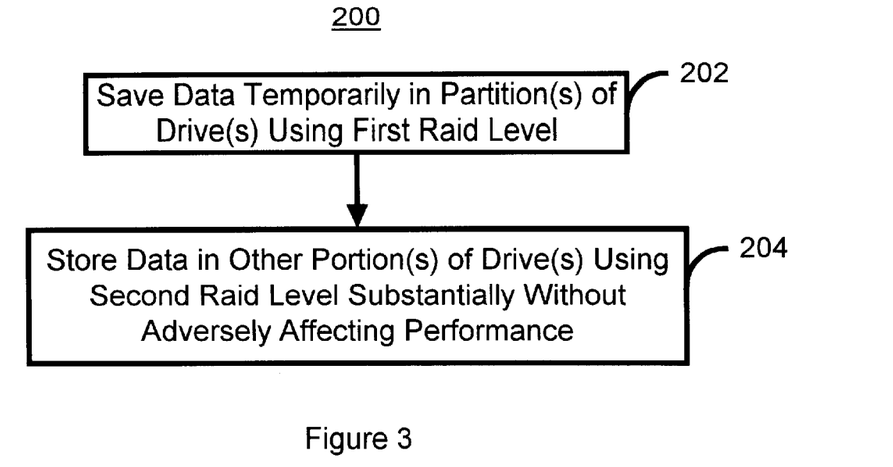
FIG. 3 is a high-level flow chart of a method in accordance with the present invention for more efficiently storing data in a RAID subsystem.

FIG. 3 depicts a high-level flow chart of a method 200 in accordance with the present invention for writing data. The method 200 may be used throughout operation of the RAID subsystem 120. Data to be written is temporarily stored in one or more of the partitions 131 and 135 using a first RAID level, via step 202. In a preferred embodiment, the first RAID level is RAID-1. Thus, redundancy is provided using data mirroring. The data in the partitions 131 and 135 is then stored in the remaining portion of two or more of the drives 130, 132, 134, and 136 using a second RAID level, via step 204. Step 204 is performed when such storage would not substantially adversely affect performance of the RAID subsystem 120. In a preferred embodiment, step 204 is performed when usage of the RAID subsystem 120 drops below a particular threshold or when the available bandwidth of the RAID subsystem 120 increases to a particular level. In one embodiment, step 204 may also be performed to ensure that the partition(s) 131 and 135 being used do not overflow. Also in a preferred embodiment the second RAID level is RAID-5. In a preferred embodiment, the first RAID level requires a smaller amount of time to perform a write operation than the second RAID level.

Thus, the partitions 131 and 135 may be used as caches. The first RAID level is used to relatively rapidly and temporarily store data in the partitions 131 and 135. Thus, the write delay appearing to a user is decreased. When system performance will not be compromised, the data is permanently stored in the remaining portion of the drives 130, 132, 134, and 136 using the second RAID level. Storage in step 204 using the second RAID level, RAID-5, includes calculating parity. Thus, step 204 may be performed using the conventional method 10. However, step 204 is performed at a time when performance of the system 100 is not substantially adversely affected. Thus, the caches, partitions 131 and 135, may be flushed. Consequently, the benefits of the second RAID level, such as RAID-5, may be achieved while reducing the delays apparent to the user.

Figure 4:
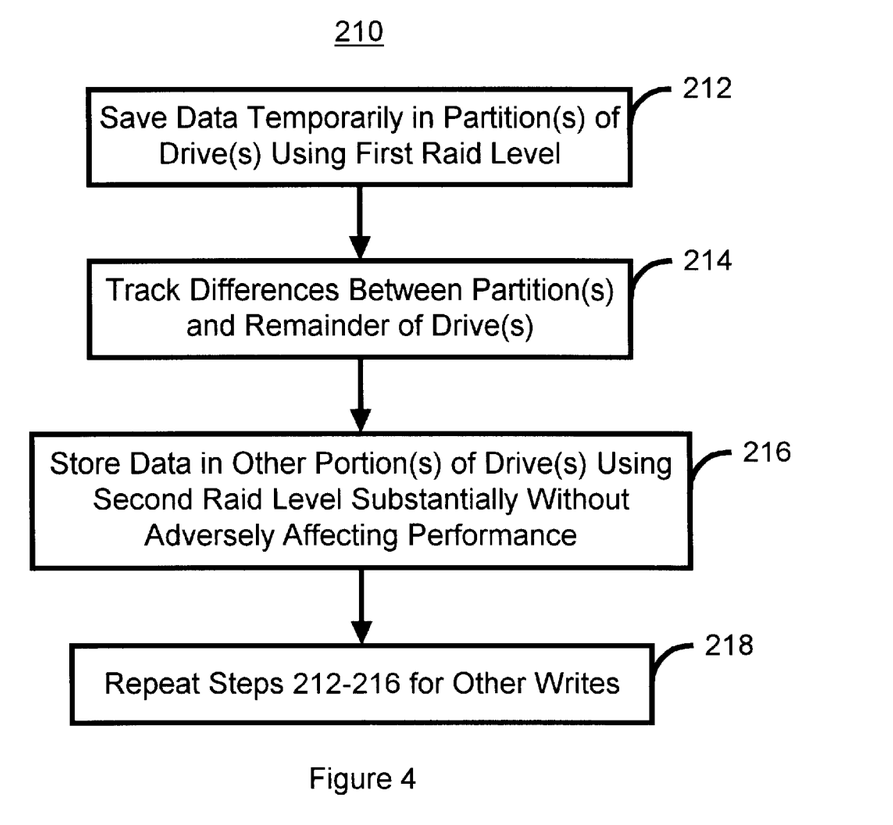
FIG. 4 is a more detailed flow chart of a method in accordance with the present invention for more efficiently storing data in a RAID subsystem.

FIG. 4 depicts a more detailed flow chart of a method 210 for storing data in accordance with the present invention. The method 210 can preferably be carried out throughout usage of the RAID subsystem 120 is used. Data are temporarily stored in one or more of the partitions 131 and 135 using the first RAID level, via step 212. Step 212 is analogous to step 202. The difference between the data stored in the partition(s) 131 and 135 and the portions of the drives 130, 132, 134, and 136 to which the data correspond are tracked, via step 214. The data are then stored in the corresponding portions of the drives 130, 132, 134, and 136 using the second RAID level, via step 216. Step 216 is carried out when the performance of the RAID subsystem 120 will not be adversely affected. Step 216 is thus analogous to step 204 of the method 200, depicted in FIG. 3. Thus, data are cached and flushed to the appropriate locations, via step 212 through 216. Steps 212–216 may then be repeated for data for additional write requests, via step 218.

Figure 5:
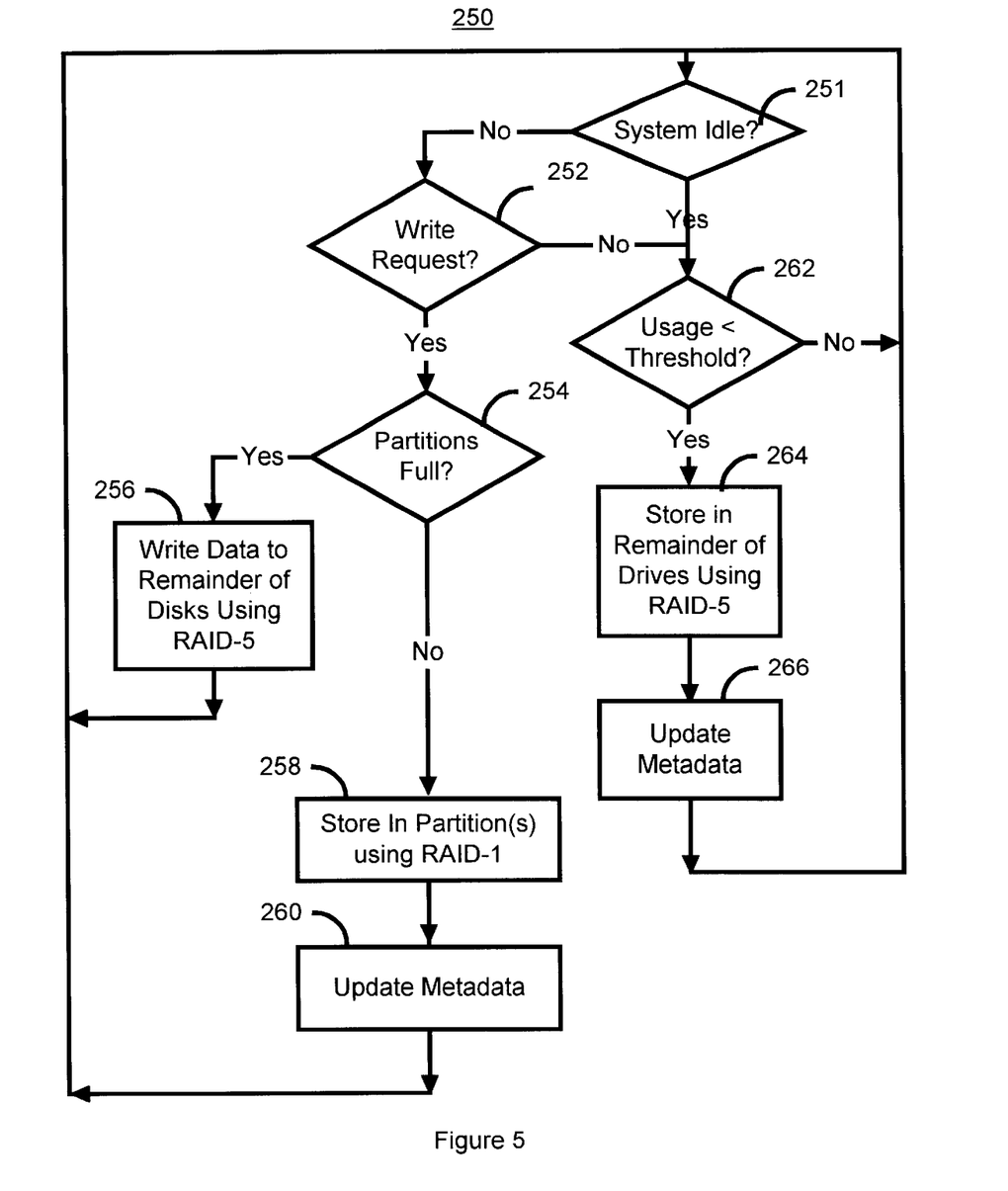
FIG. 5 depicts a flow chart of a preferred embodiment of a method in accordance with the present invention for more efficiently storing data in a RAID subsystem.

FIG. 5 depicts a more detailed flow chart of a preferred embodiment of a method 250 in accordance with the present invention for storing data in the RAID subsystem 120. It is determined in step 251 if the system is idle. If so, then steps 262 through 266, discussed below. Otherwise, it is determined if a write request has been received, via step 252. The write request could be to write to portions of the drives 130, 132, 134, or 136 that have not previously been written or for modifying portions of the drives 130, 132, 134, or 126 which have previously been written. In a preferred embodiment, the write is from the cache 126 to the drives 130, 132, 134, and 136 of the RAID subsystem 120. If a write request has been received, it is determined if the partition or partitions 131 and 135 to be used are considered full, via step 254. If so, then the write request is processed by using RAID-5 to write to the remaining portions of the drives 130, 132, 134, or 136, via step 256. If the partition or partitions 131 and 135 are not full, then the data for the write request is stored in one or more of the partitions 131 and 135 using RAID-1, via step 258. Because RAID-1 is used, an extra copy of the data used to provide redundancy is stored in one or more of the partition(s). Metadata showing the correspondence between the blocks in the partition(s) 131 and 135 being modified and the corresponding parts of the remaining portions of the drives 130, 132, 134, and 136 may then be updated, via step 260. In a preferred embodiment, step 260 includes providing entries in a log indicating the data stored in the partition, the location of the data in the partition, and the block in the remainder of the drives 130, 132, 134, or 136 to which the data corresponds.

If it is determined in step 252 that a write request is not received, then it is determined if the usage of the RAID subsystem 120 has dropped below a particular threshold, via step 262. If the RAID subsystem 120 usage has not dropped sufficiently, then the method 250 returns to step 252. If the RAID subsystem 120 usage has dropped below the threshold, then a portion of the partition(s) 131 and 135 may be flushed. Thus, via step 264, at least a portion of the data stored in the partition(s) 131 and 135 is stored in the remainder of the drives 130, 132, 134, or 136 using RAID-5. In one embodiment, Step 264 includes implementing the read-modify-write method described with respect to FIG. 1. The metadata for the portions just stored are then updated, via step 266. In a preferred embodiment, step 266 includes removing information for entries corresponding to data which was written in step 258. The metadata is kept in non-volatile storage, which may be considered part of the memory 124. In one embodiment, the non-volatile storage is a battery-backed memory. The steps 262, 264, and 266 may also be performed if the system is determined to be idle in step 251.

Figure 6A:
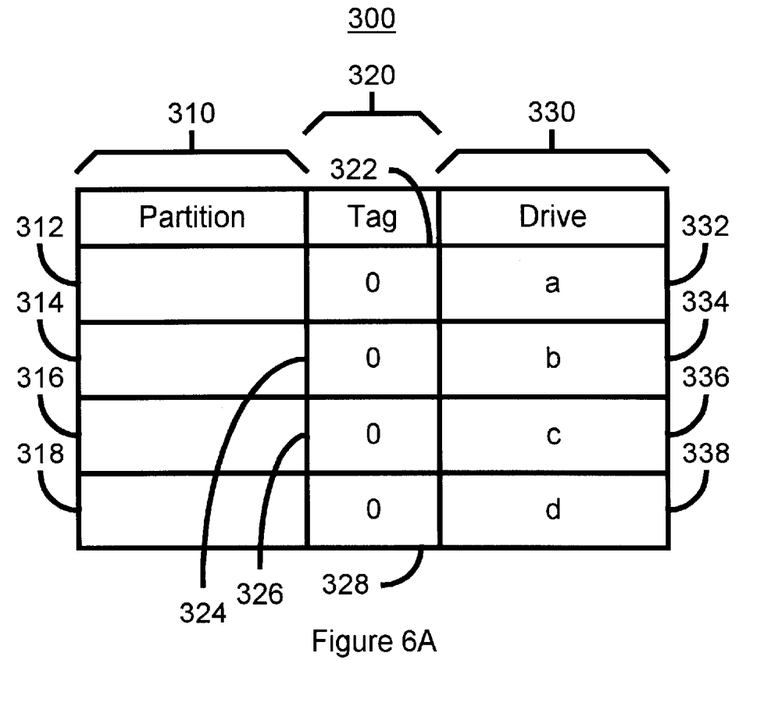
FIG. 6A is a block diagram of metadata for the original and cached data when all the data are permanently stored.
Figure 6B:
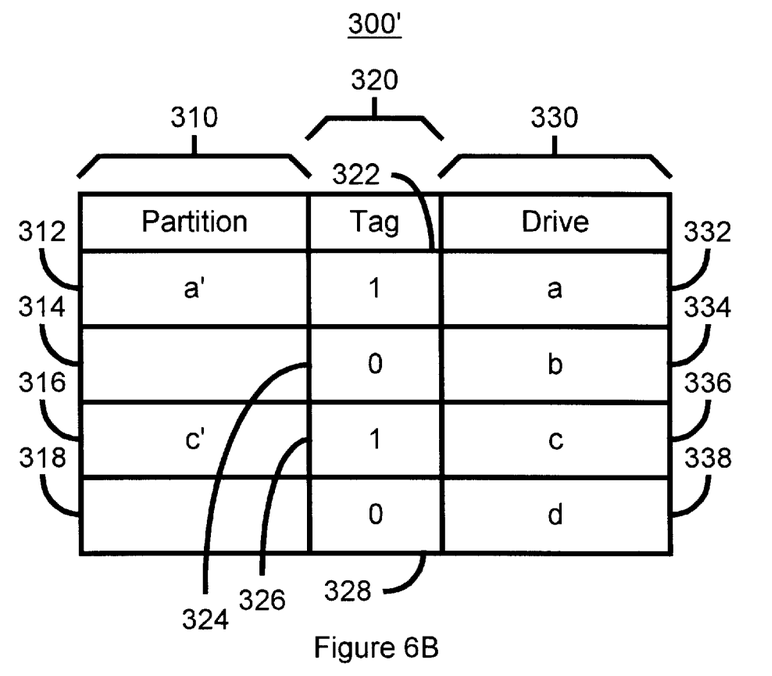
FIG. 6B is a block diagram of metadata for the original and cached data after a write request has been processed.
Figure 6C:
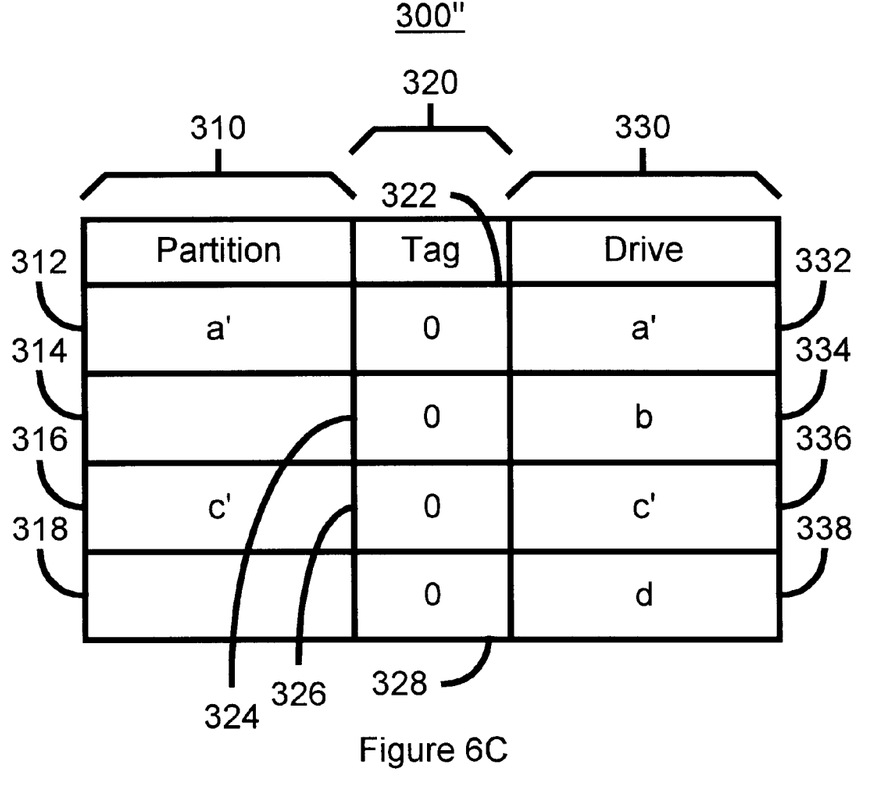
FIG. 6C is a block diagram of metadata for the original and cached data just after the cached data are permanently stored.

FIGS. 6A–C depict metadata 300 which indicates the correspondence between blocks in the partitions 131 and 135 and blocks in the remainder of the drives 130, 132, 134, or 136. FIG. 6A depicts the metadata when the partitions do not currently store data. Thus, the entries 312–318 in the partition column 310 are empty and the entries 322–328 in the tag column are zero, while the drive column 312 stores data locations "a", "b", "c", and "d" in entries 332, 334, 336, and 338, respectively. In an alternate embodiment, the metadata 300 may be empty, indicating that the partitions 131 and 135 currently do not store new data. FIG. 6B is a block diagram of metadata 300' for the original and cached data after a write request has been processed and data written to the partition(s) 131 and 135. The request is for block locations a and c to be rewritten with new data. Once available block locations for new data are determined in partition(s) 131 and 135, the locations are stored in partition column 310, depicted in FIG. 6B. The new data are stored in partition(s) 131 and 135 in locations a' and c'. In FIG. 6B, locations a' and c' correspond to locations a and c in the remaining portions of the drives 130, 132, 134, and 136. In addition, the entries 322 and 326 for the tags 320 are ones, indicating that the partitions 131 and 135 contain newer data corresponding to locations a and c in the remaining portions of the drives 130, 132, 134, and 136. When a further read request accesses location a of the remaining portions of the drives 130, 132, 134, and 136, the metadata is checked in drive column 330 for entry 332 that references location a with corresponding tag 322, which is a one. If the tag 322 is set to a one, the read request is serviced from the corresponding location a' in the partition(s) 131 and 135, as specified by the partition entry 312. If the tag 322 is not set to one, the data at location a is serviced from the remaining portions of the drives 130, 132, 134, and 136. In an alternate embodiment, the metadata 300' might include entries only for the blocks in the partition(s) 131 and 135 storing a' and c' and the corresponding blocks in the remaining portions of the drives 130, 132, 134, and 136 storing a and c, respectively. FIG. 6C is a block diagram of metadata 300" for the original and cached data just after the cached data are stored in the remaining portions of the drives 130, 132, 134, and 136 using RAID-5. The entries 332 and 336 in the tag column 320 now contain zeroes, indicating that the new data from the partition(s) 131 and 135 is stored in the remaining portions of the drives 130, 132, 134, and 136. In other words, new data stored in locations a' and c' using RAID-1 has been flushed. Therefore, the locations a' and c' in the partition(s) 131 and 135 can be used for holding further new data. Also, further read requests to locations a and c of the remaining portions of the drives 130, 132, 134, and 136 are serviced from the remaining portions of the drives 130, 132, 134, and 136 can be serviced in a conventional manner. In an alternate embodiment, the metadata 300' would be empty.

Thus, data can be temporarily stored in one or more of the partitions 131 and 135 using RAID-1. In addition, metadata 300 tracking the changes stored in the partitions 131 and 135 is maintained. When RAID subsystem 120 resources are available, the data temporarily stored using RAID-1 is stored using RAID-5. As long as the steady state operation of the RAID subsystem 120 allows the updating of the metadata 300 and periodic flushing of the partition(s) 131 and 135 using the steps 204, 216, or 266–270 of the methods 200, 210, or 250, respectively, the RAID subsystem 120 will have improved response time for write operations. This is because for most write operations, RAID-1 is faster than RAID-5. In effect, the RAID subsystem 120 is "caching" the writes to a faster portion of its drives, the partitions 131 and 135. The partitions are faster because RAID-1 is used rather than RAID-5. In some installations, the performance boost obtained could be enough to satisfy requirements, and a better cost/performance ratio would be obtained.

The method and system in accordance with the present invention find particular utility in a system 100 in which the RAID subsystem 120 maintains a relatively large database. Write requests in such a system would typically seek to change only a very small portion of the data. Without the method and system in accordance with the present invention, such writes would cause a delay due to the read-modify write algorithm. However, because the method and system in accordance with the present invention use RAID-1 for temporary storage, writes will not be delayed. Because the writes account for only a small percentage of the use of the RAID subsystem 120, the partitions 131 and 135 are unlikely to be filled during operation. Thus, the RAID subsystem 120 can periodically store data and flush the partitions 131 and 135 so that the partitions 131 and 135 do not overflow.

Furthermore, the partitions 131 and 135 could be used as a write-back cache. In such a case, data would be written to the partitions, instead of to a write-back cache.

A method and system has been disclosed for more efficiently storing data on a RAID subsystem. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for storing data in a system including a redundant array of inexpensive disks (RAID) data storage subsystem, the RAID data storage subsystem including a plurality of drives, the method comprising the steps of:
   (a) temporarily storing data in a first portion of the plurality of drives using a first RAID level, the data including any data to be stored using the RAID data storage subsystem when usage of the RAID data storage subsystem is above a particular threshold;
   (b) providing metadata indicating a location of the first portion of the plurality of drives:
   (c) storing the data in a second portion of the plurality of drives using a second RAID level; and
   (d) updating the metadata to indicate that the data has been stored;
   wherein the storing step (c) is performed at a time when performance of the system is not adversely affected by performing the storing step (c) any time data exists in the first portion of the plurality of drives and the usage of the RAID data storage subsystem drops below the particular threshold and wherein the temporarily storing step (a) and storing step (c) can be performed throughout operation of the RAID data storage subsystem.

2. The method of claim 1 wherein the system further has an unused bandwidth and wherein the storing step (c) includes the step of:

(c1) storing a portion of the data using the second RAID level when the unused bandwidth is less than a particular level.

3. The method of claim 2 wherein the temporarily storing step (a) includes the step of:
   (a1) storing the data in the second portion of the plurality of drives using the second RAID level if the first portion of the plurality of drives is full even if the unused bandwidth is not less than a particular level.

4. The method of claim 1 wherein the first RAID level is RAID-1.

5. The method of claim 4 wherein the second RAID level is RAID-5.

6. The method of claim 1 wherein the first portion of the plurality of drives further includes a portion of a first drive of the plurality of drives.

7. The method of claim 6 wherein the second portion of the plurality of drives further includes a portion of a second drive of the plurality of drives.

8. The method of claim 1 wherein the first portion of the plurality of drives further includes a portion of each drive of the first portion of the plurality of drives.

9. A computer system for storing data comprising:
   a plurality of drives in a redundant array of inexpensive disks (RAID) data storage subsystem, a first portion of the plurality of drives for temporarily storing the data using a first RAID level, the data including any data to be stored using the RAID data storage subsystem when usage of the RAID data storage subsystem is above a particular threshold, and a second portion of the plurality of drives for storing the data using a second RAID level; and
   metadata for tracking the data when stored in the first portion of the plurality of drives;
   wherein the data stored temporarily in the first portion of the plurality of drives is stored in the second portion of the plurality of drives using the second RAID level at a time when performance of the computer system is not adversely affected by storing the data, any time data exists in the first portion of the plurality of drives and usage of the RAID data storage subsystem drops below the particular threshold; and
   wherein temporary storage of the first portion of the plurality of drives and storage in the second portion of the plurality of drives can occur throughout operation of the RAID data storage subsystem.

10. The computer system of claim 9 further including an unused bandwidth, and wherein the data are stored using the second RAID level when the unused bandwidth is less than a particular level.

11. The computer system of claim 10 wherein the data are also stored in the second portion of the plurality of drives using the second RAID level if the first portion of the plurality of drives is full even if the unused bandwidth is not less than a particular level.

12. The computer system of claim 9 wherein the first RAID level is RAID-1.

13. The computer system of claim 12 wherein the second RAID level is RAID-5.

14. The computer system of claim 9 wherein the first portion of the plurality of drives further includes a portion of a first drive of the plurality of drives.

15. The computer system of claim 14 wherein the second portion of the plurality of drives further includes a portion of a second drive of the plurality of drives.

16. The computer system of claim 9 wherein the first portion of the plurality of drives further includes a portion of each drive of the first portion of the plurality of drives.

* * * * *